United States Patent [19]
Jones et al.

[11] Patent Number: 5,619,728
[45] Date of Patent: Apr. 8, 1997

[54] DECOUPLED DMA TRANSFER LIST STORAGE TECHNIQUE FOR A PERIPHERAL RESOURCE CONTROLLER

[75] Inventors: Craig S. Jones; Jay Lory; Victor K. Pecone, all of Austin, Tex.

[73] Assignee: Dell USA, L.P., Round Rock, Tex.

[21] Appl. No.: 326,570

[22] Filed: Oct. 20, 1994

[51] Int. Cl.⁶ ........................................ H01J 3/00
[52] U.S. Cl. .................... 395/847; 395/309; 395/308; 395/306; 395/842; 395/844; 395/830; 395/835; 395/280
[58] Field of Search ................................. 395/842, 843, 395/844, 845, 846, 847, 848, 856, 828, 200.07, 306, 308, 309

[56] References Cited

U.S. PATENT DOCUMENTS

| | | | |
|---|---|---|---|
| 5,325,489 | 6/1994 | Mitsuhira et al. | 395/275 |
| 5,359,715 | 10/1994 | Heil et al. | 395/309 |
| 5,437,042 | 7/1995 | Culley et al. | 395/800 |
| 5,450,551 | 9/1995 | Amini et al. | 395/299 |
| 5,499,346 | 3/1996 | Amini et al. | 395/308 |
| 5,522,050 | 5/1996 | Amini et al. | 395/306 |

*Primary Examiner*—Jack B. Harvey
*Assistant Examiner*—Raymond N. Phan

[57] ABSTRACT

A peripheral resource controller such as a caching disk array controller is provided for controlling the transfer of data between a host bus and a peripheral resource, such as an array of hard disk drives. The peripheral resource controller includes a bus interface controller for providing an interface between the host bus and a local bus of the peripheral controller. The bus interface controller further includes a peripheral bus interface which accommodates accesses to a peripheral bus and a DMA controller for controlling direct memory access operations between a local memory of the peripheral controller and a system memory of the host computer. A DMA transfer list memory is coupled to the peripheral bus for storing DMA transfer information. The DMA controller fetches host and local address as well as block size information from the DMA transfer list memory to thereby effectuate DMA operations. In one specific implementation, a local processor of the peripheral controller loads the DMA transfer information into the DMA transfer list memory by causing the execution of one or more memory write cycles on the local bus. A local bus interface of the bus interface controller responds as a target and routes the data to a peripheral bus interface. The peripheral bus interface, which functions as a master of the peripheral bus, responsively effectuates corresponding cycles on the peripheral bus to write the DMA transfer information into the DMA transfer list memory.

23 Claims, 5 Drawing Sheets

DECOUPLED DMA TRANSFER LIST STORAGE TECHNIQUE FOR A PERIPHERAL RESOURCE CONTROLLER

BACKGROUND OF THE INVENTION

1. Field of the Invention

This invention relates to computer systems and more particularly to peripheral resource controllers that include a DMA transfer mechanism for transferring data between a host computer and a peripheral resource. The invention further relates to high performance adapter cards including disk controllers.

2. Description of the Relevant Art

High performance adapter cards such as disk controllers and network controllers coordinate the transfer of data between a host computer and a peripheral resource. A typical adapter card includes a DMA controller which provides a hardware mechanism for transferring large sequential groups of data between a host system memory and a local memory of the adapter card. The adapter card's local memory typically includes a RAM buffer, often in the form of a cache memory, which temporarily holds data prior to sending it to the host computer or to the peripheral resource.

The DMA controller associated with a peripheral resource controller must be programmed with the host and local addresses for a desired sequential transfer request along with the length of the transfer. The length of the transfer is typically specified as a number of "blocks", wherein each block consists of a predetermined amount of data. The local processor typically loads the address and block length information in a memory table or list. This list is then read by the DMA controller to set-up each block transfer for execution.

Further details regarding the operation of a typical peripheral resource controller will be better understood with reference to FIGS. 1 and 2. FIG. 1 is a block diagram of a computer system 100 including an exemplary adapter card illustratively embodied as peripheral controller 104. A host processor 102 and a system memory 103 are coupled to peripheral controller 104 via a host bus 106. A plurality of SCSI devices 106A–106D are further shown coupled to peripheral controller 104 via SCSI buses 108 and 110. The peripheral controller 104 includes a bus interface controller 120 coupled to a local processor 122 and to a local memory 124 via a local bus 126. A pair of SCSI processors 128 and 130 as well as a DMA transfer list memory 132 are finally shown coupled to local bus 126.

FIG. 2 is a block diagram of the bus interface controller 120 incorporated within the peripheral controller 104 of FIG. 1. The bus interface controller 120 includes a host interface 202 coupled to host bus 106, and a local interface coupled to local bus 126. A DMA controller 208 is coupled between local interface 204 and host interface 202.

Peripheral controller 104 is illustrative of a caching disk array controller. As such, SCSI devices 106A–106D are representative of a set of SCSI hard drives. Referring collectively to FIGS. 1 and 2, if it is desired to transfer data stored within one or more sectors of the hard drives into system memory 103, host processor 102 must first provide a data request command, which may be in the form of a data request structure stored within local memory 124, to peripheral controller 104 to thereby cause local processor 122 to determine the particular sectors of the hard drives at which the requested data resides. If the data is not already present within a cached portion of the local memory 124, the local processor 122 causes the requested data to be transferred from the appropriate hard drive(s) into local memory 124 under control of the respective SCSI processor 128 or 130.

In addition to determining the particular hard drives and corresponding sectors in which the requested data resides and causing the transfer of those sectors into local memory 124, local processor 122 also loads into the DMA transfer list memory 132 the host and local addresses for a sequential transfer along with the number of blocks forming each sequential transfer. Once the requested data (or portions thereof) is stored within the local memory 124 and the corresponding address and block length information has been stored within DMA transfer list memory 132, local processor 132 invokes DMA controller 208 to begin a direct memory access transfer operation wherein DMA controller 208 reads the sequential transfer information from DMA transfer list memory 132 and responsively effectuates a transfer of the data from local memory 124 to system memory 103 without the supervisory control of either the host processor 102 or the local processor 122.

Since the DMA transfer list memory 132 resides on local bus 126, DMA controller 208 must arbitrate for local bus 126 to retrieve the transfer list address and block length information from the DMA transfer list memory 132. This reduces the DMA performance as well as limits the ability of local processor 322 to perform concurrent bus operations. Although the DMA transfer list memory 132 could be decoupled from local bus 126 by integrating it internally within bus interface controller 120, such a solution is typically not cost effective, particularly where the bus interface controller 120 is fabricated using FPGA or gate array implementations.

SUMMARY OF THE INVENTION

The problems outlined above are in large part solved by a decoupled DMA transfer list storage technique for a peripheral resource controller in accordance with the present invention. In one embodiment, a peripheral resource controller such as a caching disk array controller is provided for controlling the transfer of data between a host bus and a peripheral resource, such as an array of hard disk drives. The peripheral resource controller includes a bus interface controller for providing an interface between the host bus and a local bus of the peripheral controller. The bus interface controller further includes a peripheral bus interface which accommodates accesses to a peripheral bus and a DMA controller for controlling direct memory access operations between a local memory of the peripheral controller and a system memory of the host computer. A DMA transfer list memory is coupled to the peripheral bus for storing DMA transfer information. The DMA controller fetches host and local address as well as block size information from the DMA transfer list memory to thereby effectuate DMA operations. In one specific implementation, a local processor of the peripheral controller loads the DMA transfer information into the DMA transfer list memory by causing the execution of one or more memory write cycles on the local bus. A local bus interface of the bus interface controller responds as a target and routes the data to a peripheral bus interface. The peripheral bus interface, which functions as a master of the peripheral bus, responsively effectuates corresponding cycles on the peripheral bus to write the DMA transfer information into the DMA transfer list memory. Since the DMA controller does not have to arbitrate for the local bus to access the DMA transfer list information, improved DMA performance may be advantageously attained, and improved local processor performance may also be attained. In addition, since the DMA transfer list memory is not incorporated within the bus interface controller, costs may be reduced for FPGA and gate array implementations.

Broadly speaking, the present invention contemplates a peripheral resource controller for providing an interface between a host bus of a host computer and a peripheral resource. The peripheral resource controller comprises a local memory operatively coupled to a local bus, a DMA transfer list memory unit coupled to a peripheral bus for storing DMA transfer information, and a bus interface controller coupled to the local bus. The bus interface controller includes a host bus interface for providing an interface to the host bus, a local bus interface for providing an interface to the local bus, and a peripheral bus interface for providing an interface to the peripheral bus. The bus interface controller further includes a DMA controller coupled to the local bus interface and to the peripheral bus interface. The DMA controller is capable of reading the DMA transfer information stored within the DMA transfer list memory and of effectuating a transfer of data from the local memory to the host bus.

The invention further contemplates a method for operating a peripheral resource controller. The peripheral resource controller includes a bus interface controller for providing an interface between a host bus and a local bus, wherein the bus interface controller includes a DMA controller coupled to the local bus through a local bus interface and to a peripheral bus through a peripheral bus interface. The method comprises the steps of providing a transfer request from the host bus to the local bus, storing DMA transfer information within a DMA transfer list memory unit coupled to the peripheral bus, and causing the DMA controller to read the DMA transfer information stored within the DMA transfer list memory. The method comprises the further step of transferring selected data from a local memory coupled to the local bus to the host bus by effectuating a direct memory access operation in accordance with the DMA transfer information.

BRIEF DESCRIPTION OF THE DRAWINGS

Other objects and advantages of the invention will become apparent upon reading the following detailed description and upon reference to the accompanying drawings in which.

Figure 1:
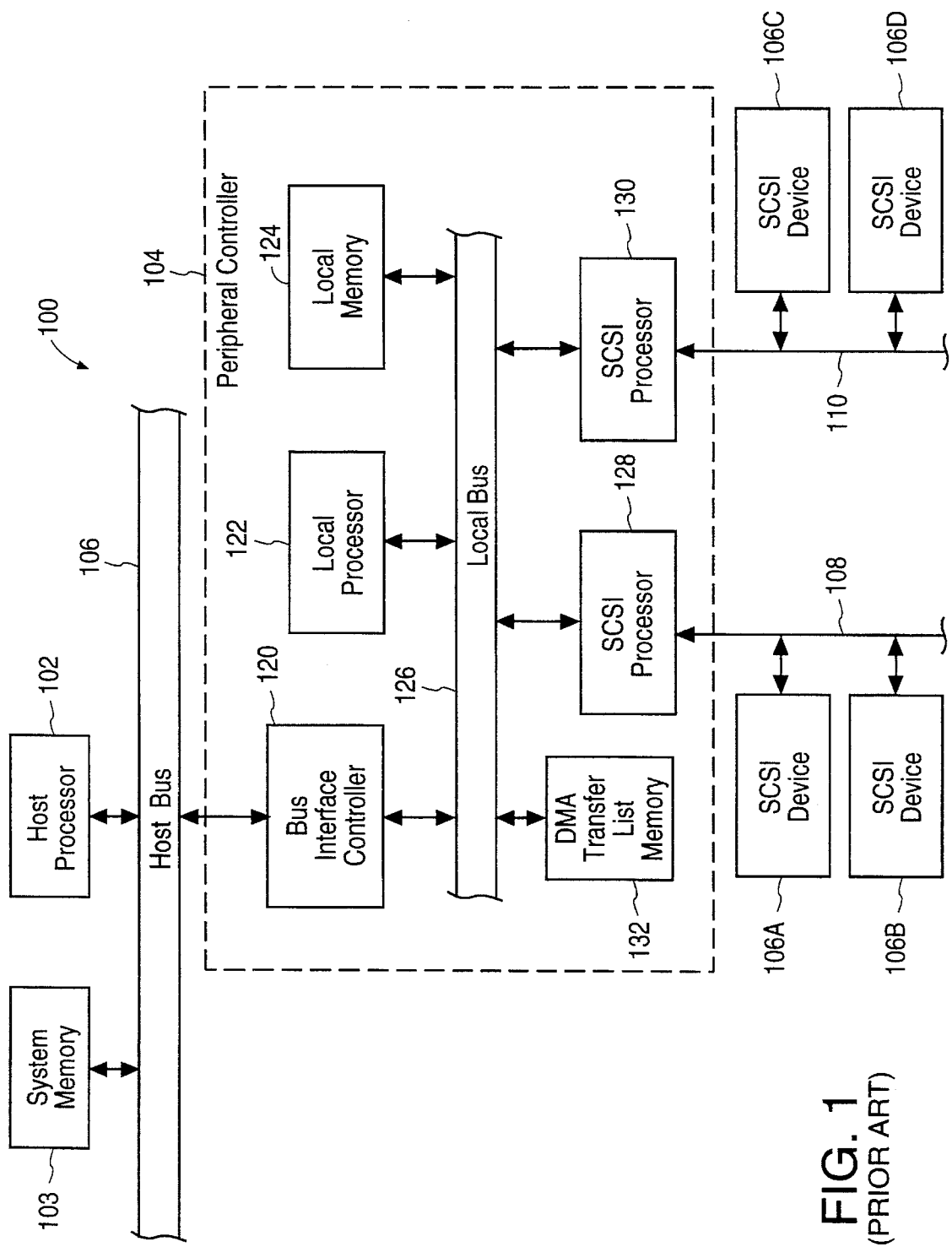
FIG. 1 is a block diagram of a computer system including a typical peripheral controller.
Figure 2:
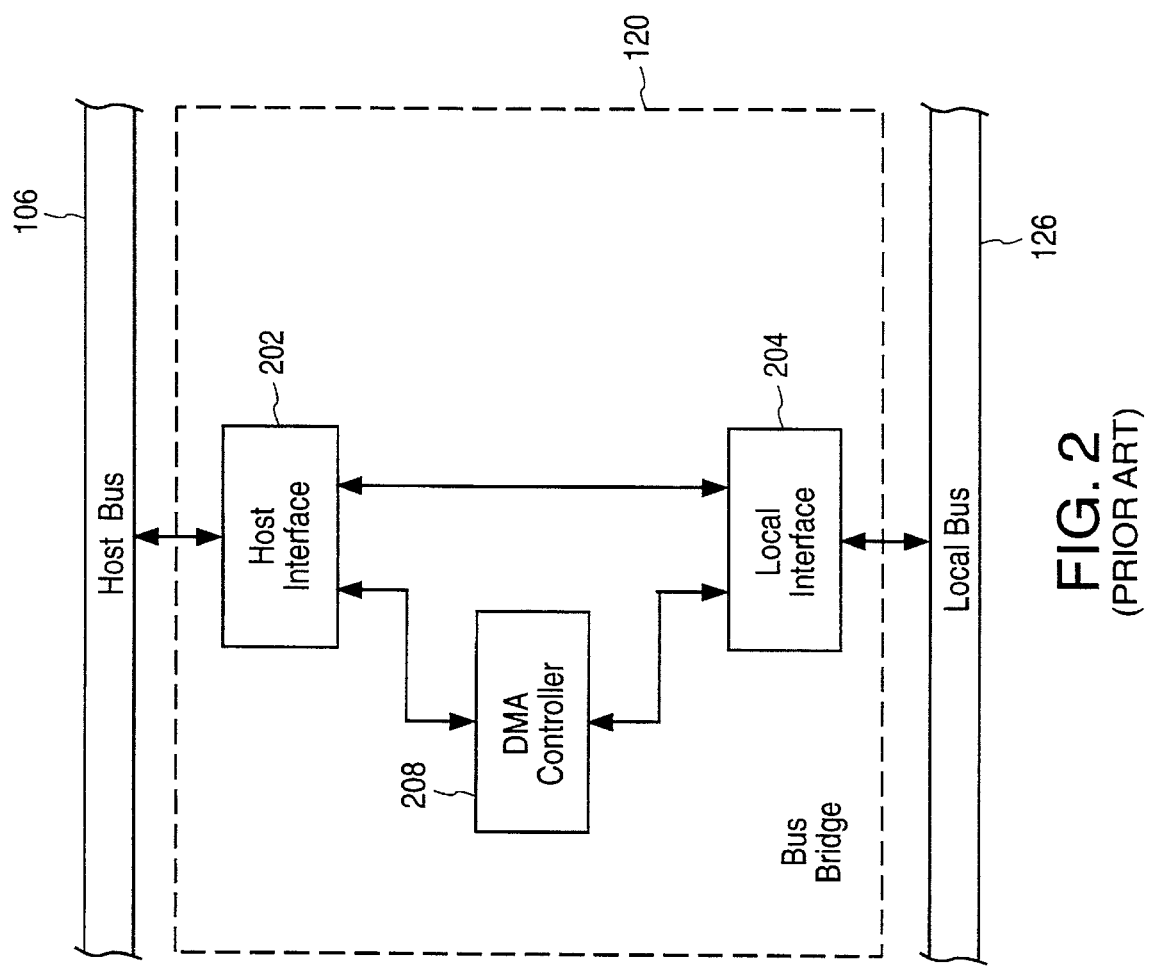
FIG. 2 is a block diagram that illustrates a bus interface controller incorporated within the peripheral controller of FIG. 1.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
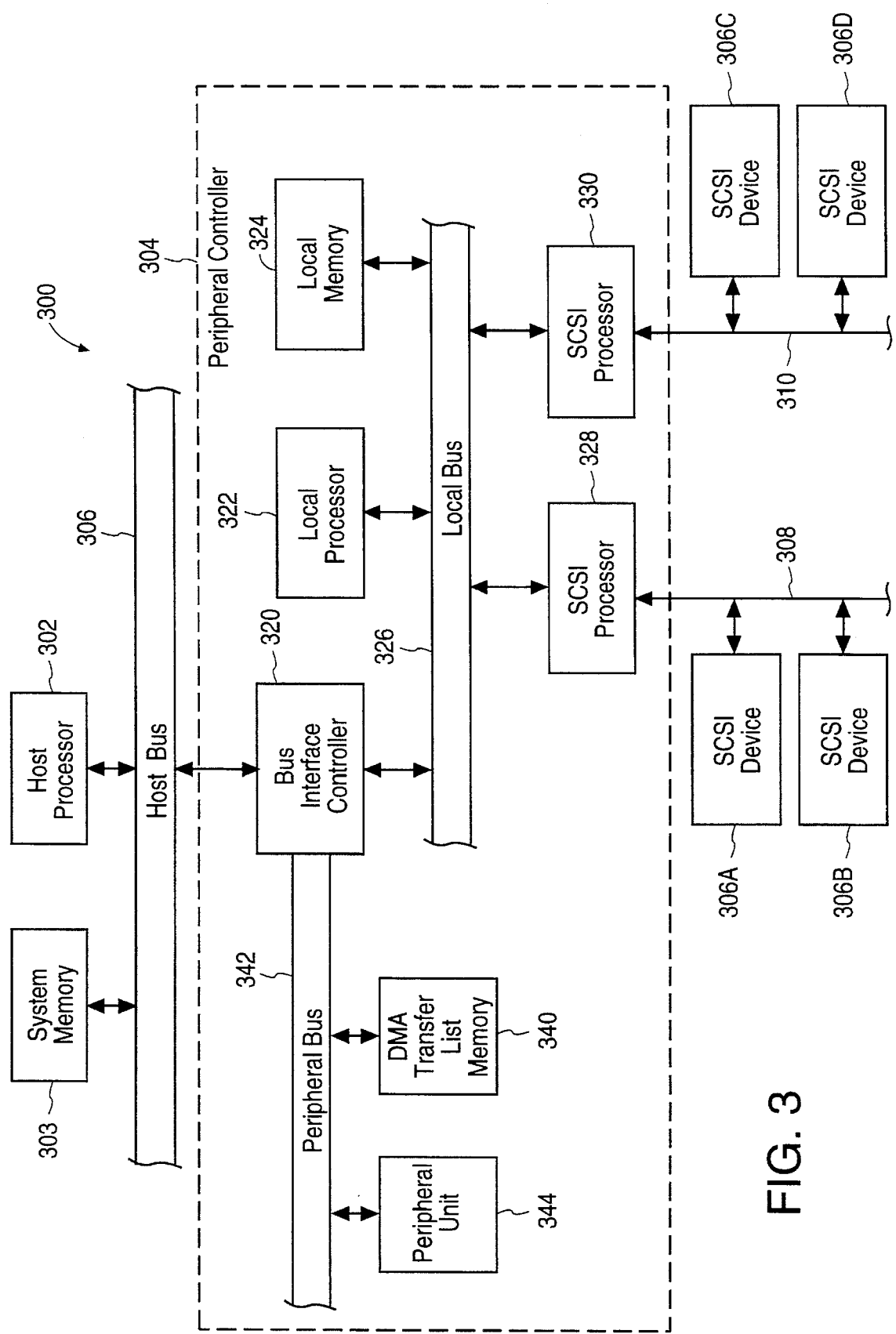
FIG. 3 is a block diagram of a computer system including a peripheral resource controller according to one embodiment of the present invention.

Turning now to FIG. 3, a block diagram is illustrated of a computer system 300 to which the present invention is adapted. Computer system 300 includes a host processor 302 and a system memory 303 coupled to a peripheral controller 304 via a host PCI bus 306. The peripheral controller 304 is coupled to a plurality of SCSI (Small Computer System Interface) devices 306A–306D via SCSI buses 308 and 310.

Peripheral controller 304 includes a bus interface controller 320 coupled to a local processor 322 and a local memory 324 via a local PCI bus 326. A pair of SCSI processors 328 and 330 are further coupled to local bus 326. A DMA transfer list memory 340 is also coupled to bus interface controller 320 through a peripheral bus 342. A peripheral unit 344 is finally shown coupled to peripheral bus 342. Details regarding the operation of peripheral controller 304 will be provided below.

SCSI devices 306A–306D are illustrative of a variety of peripheral devices including, for example, hard drives, CD ROM units, and LAN (local area network) devices. Although the particular devices shown are SCSI compatible, it is understood that peripheral devices that conform to other bus standards could be alternatively employed.

Host processor 302 is a processing unit that implements a predetermined instruction set. Exemplary processing units include the model 80486 microprocessor as well as the Pentium processor manufactured by Intel Corporation.

SCSI processors 128 and 130 are exemplary peripheral interface processors and may be implemented using, for example, NCR83C825A type SCSI processors. SCSI processors 128 and 130 control the bi-directional transfer of data to and from SCSI devices 306A–306D. It is noted that NCR53C710 type SCSI processors, among others, could be alternately employed. It is further noted that while the embodiment of FIG. 3 illustrates a pair of SCSI channels formed collectively by SCSI processors 328 and 330 and by SCSI buses 308 and 310, it is specifically contemplated that any number of SCSI channels could be provided.

Host PCI bus 306 and local PCI bus 326 are each implemented in accordance with the PCI standard bus configuration. Further details regarding the PCI standard bus configuration may be found within the "PCI Local Bus Specification"; Revision 2.0; published by the PCI Special Interest Group; Hillsboro, Oregon. This document is incorporated herein by reference in its entirety. It is understood that host bus 306 and local bus 326 could be alternatively implemented by employing other bus configurations.

DMA transfer list memory 340 may be implemented using, for example, an 8K×8 SRAM. In addition, peripheral bus 342 may be implemented as an ISA-style bus. It is noted, however, that other memory types or bus configurations may be employed to implement DMA transfer list memory 340 and peripheral bus 342. It is also noted that peripheral unit 344 is illustrative of a variety of peripheral devices, such as a real time clock, a serial port, or a FLASH nonvolatile memory unit for storing configuration or BIOS code.

Local processor 322 is a processing unit which controls well-known functions relating to the management and control of data transfers between SCSI devices 306A–306D and local memory 324. Such functions may include, for example, the management and control of caching operations such as cache tag comparison operations, cache replacement algorithms, and cache memory segregation associated with local memory 324. For configurations in which a plurality of SCSI hard drives are coupled to peripheral controller 304 to form a composite drive, local processor 322 may further control the generation and parsing of disk commands to selected drives as well as the calculation of parity data to be stored by a parity drive, if any. These functions and specific implementations thereof are well known to those of skill in the art. Local processor 122 may be implemented using, for example, a type MPC603 PowerPC processor.

Figure 4:
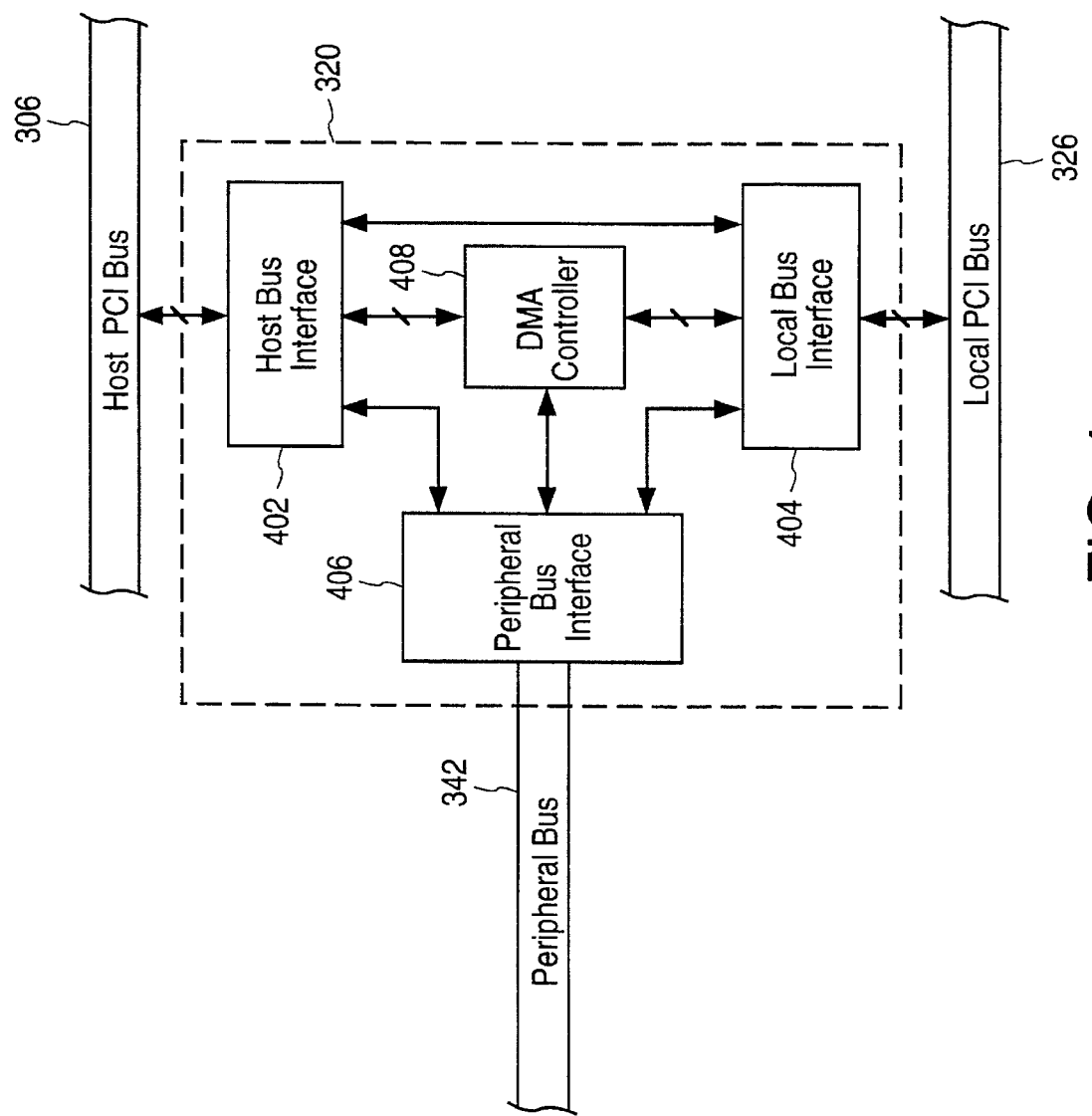
FIG. 4 is a block diagram of a bus interface controller incorporated within the peripheral resource controller of FIG. 3.

FIG. 4 is a block diagram of the bus interface controller 320. The bus interface controller 320 includes a host bus interface 402 coupled to host PCI bus 306, a local bus interface 404 coupled to local PCI bus 326, and a peripheral interface 406 coupled to peripheral bus 342. A DMA controller 408 is further coupled between local bus interface 404, host interface 402, and peripheral bus interface 406.

Referring collectively to FIGS. 3 and 4, the operation of peripheral controller 304 is next considered. If it is desired to transfer data stored within one or more of the SCSI devices 306A–306D into system memory 303, host processor 302 first provides a data request command to peripheral controller 304. In one embodiment, this data request command is in the form of a predetermined data request structure which is stored within local memory 324. Local processor 322 responsively reads the pending request within the local memory 324 and, upon determining that the current request is a read request, determines whether the requested data is contained within a cached portion of local memory 324. If the requested data does not already reside within local memory 324, local processor 322 causes the requested data (or portions thereof) to be transferred from the appropriate SCSI devices 306A–306D into local memory 324. This portion of the operation of peripheral controller 304 may be achieved in a conventional manner.

In addition to the foregoing, local processor 322 also loads the appropriate DMA transfer information into DMA transfer list memory 340. Specifically, local processor 322 executes one or more memory write operations to a set of predetermined address locations mapped within DMA transfer list memory 340. Local bus interface 404 responds as a target and accepts the DMA transfer information during each of these memory write operations. The local interface 404 further routes the DMA transfer information to peripheral interface bus 406, which responsively effectuates corresponding memory write operations on peripheral bus 342 to cause the DMA transfer information to be stored within the addressed locations of DMA transfer list memory 340. This process may be repeated to store additional DMA transfer information within DMA transfer list memory 340. In one embodiment, multiple sequential DMA transfer requests can be queued within the DMA transfer list memory 340 simultaneously, thereby allowing for pipelined DMA channel operation.

Upon loading the DMA transfer information into DMA transfer list memory 340, local processor 322 provides a command to inform the DMA controller 408 that a DMA transfer request is pending. As stated previously, DMA controller 408 operates from the DMA transfer information stored within DMA transfer list memory 340. Thus, in response to a pending DMA transfer request, DMA controller 408 reads the transfer information for a particular sequential transfer (i.e., the local bus address, the host bus address, and the number of blocks) through peripheral bus interface 406. Upon reading the transfer list information, DMA controller 408 effectuates a transfer of the requested data from local memory 324 to system memory 303 through local bus interface 404 and host bus interface 402. To accommodate the DMA transfers, DMA controller 408 may include a data queue (i.e., in the form of a FIFO buffer) for temporarily storing the data as it is passed between local bus interface 404 and host bus interface 402.

It is noted that since DMA transfer list memory 340 resides on peripheral bus 342 rather than on PCI local bus 326, DMA controller 408 does not have to arbitrate for local bus 326 before reading the DMA transfer information. Furthermore, since in the preferred embodiment peripheral bus 342 is a slave-only bus (i.e., peripheral bus interface 406 is the only master of peripheral bus 342), arbitration of peripheral bus 342 by DMA controller 408 is also unnecessary. Thus, enhanced DMA performance may be attained. In addition, since DMA controller 320 is not required to access local PCI bus 326 when reading the DMA transfer information, improved performance relating to other masters of the local PCI bus 326, such as local processor 322, may be attained.

In a preferred embodiment, the DMA transfer list memory 340 as well as peripheral unit 344 are accessible by masters of local PCI bus 326 as well as by masters of host PCI bus 306. In addition, data transfers from host PCI bus 306 to local PCI bus 326 are also supported by bus interface controller 320. Such data transfers may be accomplished by passing data directly from host bus interface 402 to local bus interface 404 or under the control of DMA controller 408.

Figure 5:
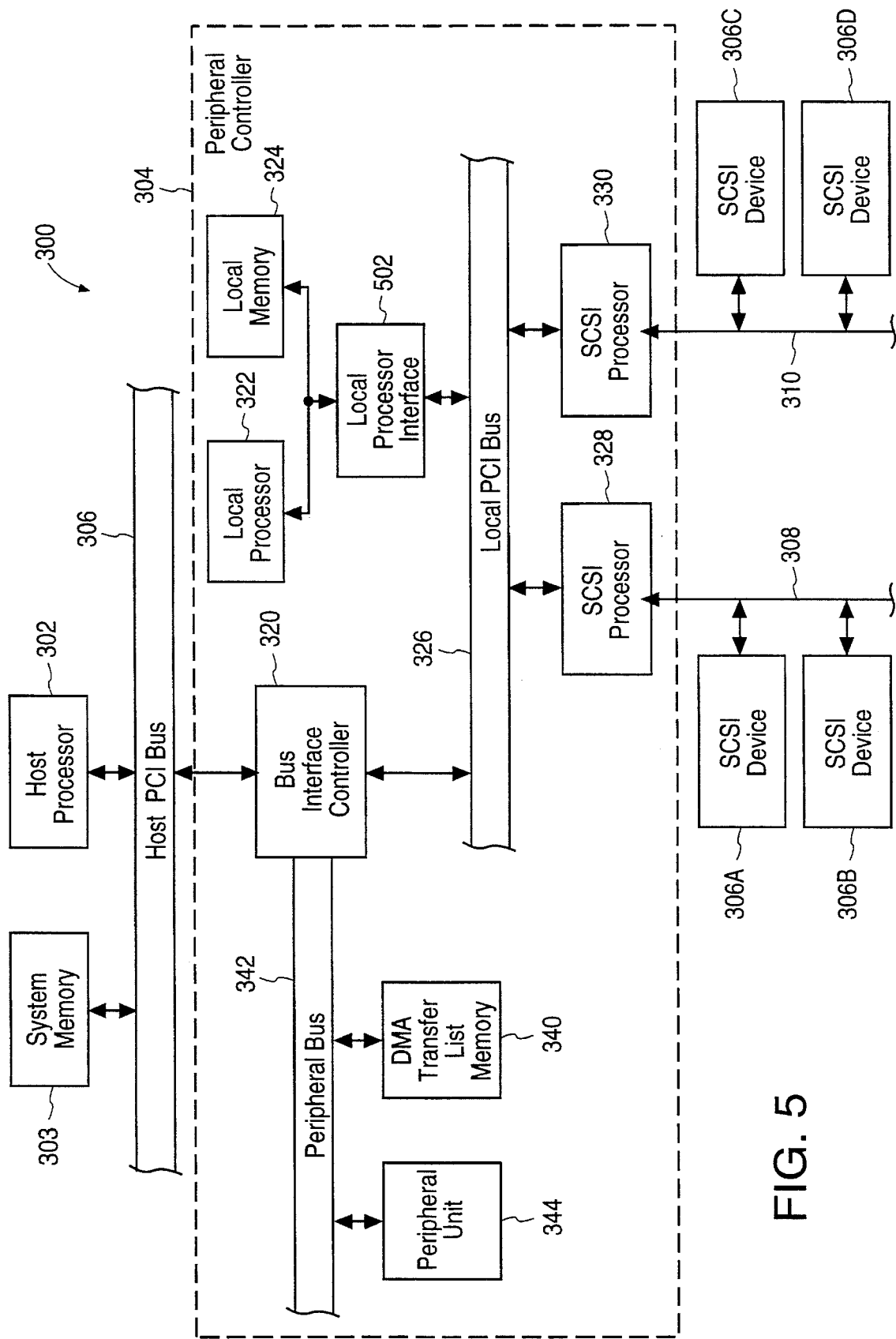
FIG. 5 is a block diagram of a computer system including a peripheral resource controller according to another embodiment of the present invention.

Referring next to FIG. 5, a block diagram is shown of an alternative embodiment of a peripheral controller 504 in accordance with the present invention. Circuit portions that correspond to those of FIG. 3 are numbered identically for simplicity and clarity.

The peripheral controller 504 of FIG. 5 is similar to that of FIG. 3; however, local processor 322 and local memory 324 are operatively coupled to local PCI bus 326 through a local processor interface 502, rather than being directly coupled to local PCI bus 326. Other operational aspects of the system of FIG. 5 are similar to those of the system of FIG. 3.

It is noted that a system in accordance with the present invention may be implemented in conjunction with a variety of other bus transfer techniques and alternative system configurations. For example, the present invention may be implemented in conjunction with systems employing either non-pipelining or pipelining techniques. In addition, the bus interface controller 320 as described above may be embodied within other peripheral controllers such as, for example, CD-ROM controllers and LAN (Local Area Network) controllers.

It is finally noted that computer-aided design tools may be employed to reduce the block diagrams of FIGS. 3–5 to sequential logic circuitry. Exemplary computer-aided design tools include the behavioral language Verilog as well as the VHSIC hardware description language.

The systems of FIGS. 3–5 may further be configured in accordance with the teachings of the co-pending, commonly assigned patent applications: Ser. No. 08/319,689 SYSTEM AND METHOD FOR ACCESSING PERIPHERAL DEVICES ON A NON-FUNCTIONAL CONTROLLER, filed Oct. 7, 1994, and Ser. No. 08/319,207 PCI/PCI BUS INTERFACE CONTROLLER WITH NON-COUPLED PERIPHERAL SLAVE BUS EXTENSION, filed Oct. 6, 1994. These patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A peripheral resource controller for providing an interface between a host bus of a host computer and a peripheral resource comprising:
   a local bus;
   a local memory operatively coupled to said local bus;
   a peripheral bus;
   a DMA transfer list memory unit coupled to said peripheral bus for storing DMA transfer information; and
   a bus interface controller coupled to said local bus, wherein said bus interface controller includes:
      a host bus interface for providing an interface to said host bus;
      a local bus interface coupled to said host bus interface, said local bus interface for providing an interface to said local bus;
      a peripheral bus interface coupled to said local bus interface, said peripheral bus interface for providing an interface to said peripheral bus; and
      a DMA controller coupled to said local bus interface, to said host bus interface and to said peripheral bus interface, wherein said DMA controller is capable of reading said DMA transfer information stored within said DMA transfer list memory and of effectuating a transfer of data from said local memory to said host bus.

2. The peripheral resource controller as recited in claim 1 wherein said host bus interface is coupled to said peripheral bus interface to accommodate data transfers between said host bus and said peripheral bus.

3. The peripheral resource controller as recited in claim 1 further comprising a local processor operatively coupled to said local bus, wherein said local processor is capable of storing said DMA transfer information within said DMA transfer list memory unit.

4. The peripheral resource controller as recited in claim 1 wherein said peripheral bus interface is configured to operate as a master of said peripheral bus.

5. The peripheral resource controller as recited in claim 1 wherein said local bus is compatible with a PCI bus standard configuration.

6. The peripheral resource controller as recited in claim 1 further comprising a peripheral unit coupled to said peripheral bus, wherein said peripheral unit is accessible from both said host bus and said local bus.

7. The peripheral resource controller as recited in claim 3 wherein said local processor is capable of causing said DMA transfer information to be routed from said local bus interface through said peripheral bus interface and into said DMA transfer list memory unit.

8. The peripheral resource controller as recited in claim 3 wherein said local bus interface is configured to operate as a slave on said local bus to receive said DMA transfer information.

9. The peripheral resource controller as recited in claim 5 wherein said host bus is compatible with said PCI bus standard configuration.

10. The peripheral resource controller as recited in claim 3 further comprising a local processor interface coupled between said local bus and said local processor.

11. A computer system comprising:
    a host bus;
    a host processor coupled to said host bus;
    a system memory coupled to said host bus;
    a peripheral resource; and
    a peripheral resource controller coupled between said host bus and said peripheral resource for controlling a transfer of data between said peripheral resource and said host bus, said peripheral resource controller including:
       a local bus;
       a local memory operatively coupled to said local bus;
       a peripheral bus;
       a DMA transfer list memory unit coupled to said peripheral bus for storing DMA transfer information; and
       a bus interface controller coupled to said local bus, wherein said bus interface controller includes:
          a host bus interface for providing an interface to said host bus;
          a local bus interface coupled to said host bus interface, said local bus interface for providing an interface to said local bus;
          a peripheral bus interface coupled to said local bus interface, said peripheral bus interface for providing an interface to said peripheral bus; and
          a DMA controller coupled to said local bus interface, to said host bus interface and to said peripheral bus interface, wherein said DMA controller is capable of reading said transfer list information stored within said DMA transfer list memory and of effectuating a transfer of data from said local memory to said system memory.

12. The computer system as recited in claim 11 wherein said host bus interface is coupled to said peripheral bus interface to accommodate data transfers between said host bus and said peripheral bus.

13. The computer system as recited in claim 11 further comprising a local processor operatively coupled to said local bus, wherein said local processor is capable of storing said DMA transfer information within said DMA transfer list memory unit.

14. The computer system as recited in claim 11 wherein said peripheral bus interface is configured to operate as a master of said peripheral bus.

15. The computer system as recited in claim 11 wherein said local bus is compatible with a PCI bus standard configuration.

16. The computer system as recited in claim 11 wherein said host bus is compatible with said PCI bus standard configuration.

17. The computer system as recited in claim 13 wherein said local processor is capable of causing said DMA transfer information to be routed from said local bus interface through said peripheral bus interface and into said DMA transfer list memory unit.

18. A computer system as recited in claim 13 wherein said peripheral resource controller further includes a local processor interface coupled between said local bus and said local processor.

19. The computer system as recited in claim 17 wherein said local bus interface is configured to operate as a slave on said local bus to receive said DMA transfer information.

20. A method for operating a peripheral resource controller, said peripheral resource controller including a bus interface controller for providing an interface between a host bus and a local bus, said bus interface controller including a DMA controller coupled to said local bus through a local bus interface and to a peripheral bus through a peripheral bus interface and to said host bus through a host bus interface, said method comprising the steps of:

provided a transfer request from said host bus to said local bus;

storing DMA transfer information within a DMA transfer list memory unit coupled to said peripheral bus;

causing said DMA controller to read said DMA transfer information stored within said DMA transfer list memory; and transferring selected data from a local memory coupled to said local bus though said local bus interface and said host bus interface to said host bus by effectuating a direct memory access operation in accordance with said DMA transfer information.

21. The method for operating a peripheral resource controller as recited in claim 20 comprising the further step of transferring said DMA transfer information from said local memory to said DMA transfer list memory unit.

22. The method for operating a peripheral resource controller as recited in claim 20 comprising the further step of transferring said selected data from a peripheral resource into said local memory prior to performing said step of transferring said selected data from said local memory to said host bus.

23. The method for operating a peripheral resource controller as recited in claim 21 wherein said step of transferring said DMA transfer information includes the steps of receiving said DMA transfer information at said local bus interface and routing said DMA transfer information through said peripheral bus interface.

* * * * *